March 17, 1931. T. A. BOWERS 1,796,883
SINGLE-PLY PACKING RING WITH INCLOSED EXPANDER
Filed July 11, 1930
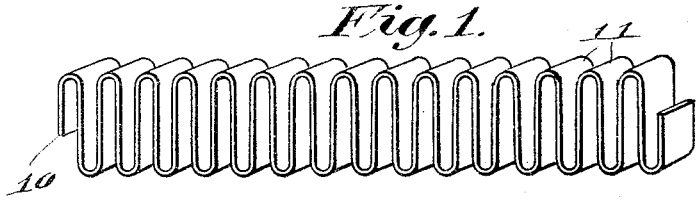
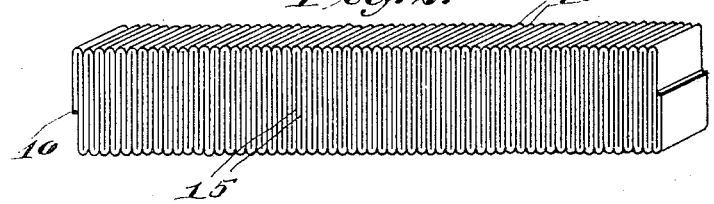
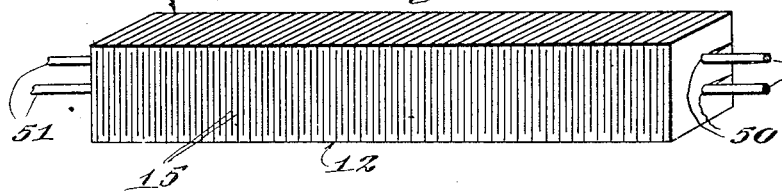
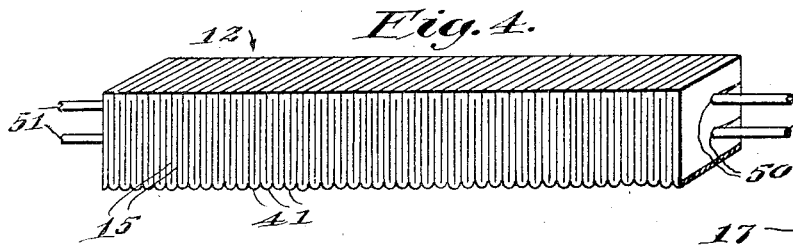
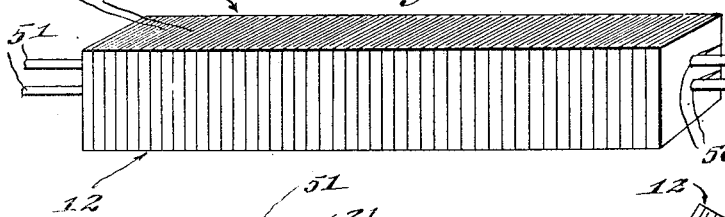
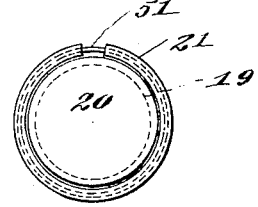
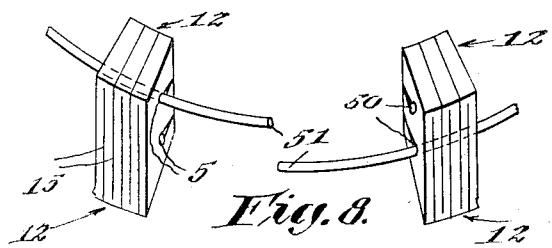
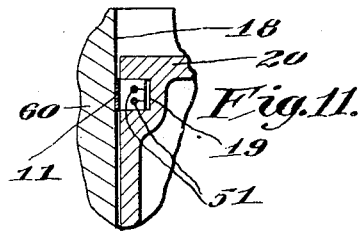
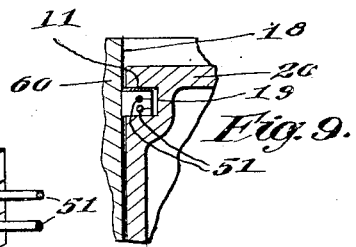
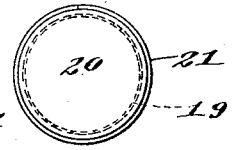
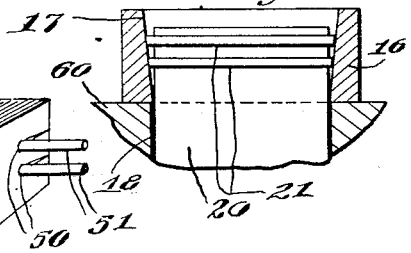
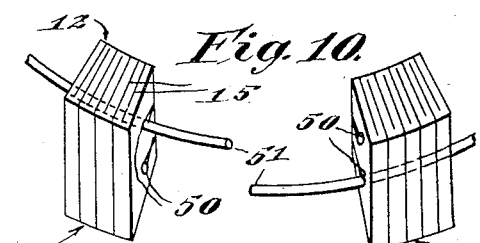
Inventor
Thomas A. Bowers.
By James C. Hamilton.
Attorney Patented Mar. 17, 1931

1,796,883

UNITED STATES PATENT OFFICE

THOMAS A. BOWERS, OF BOSTON, MASSACHUSETTS, ASSIGNOR TO PRESSED PISTON RING COMPANY, A CORPORATION OF MASSACHUSETTS

SINGLE-PLY PACKING RING WITH INCLOSED EXPANDER

Application filed July 11, 1930. Serial No. 467,253.

My present invention relates to packing rings and more particularly to packing rings for use in combination with reciprocating pistons which are used in steam engines, internal combustion engines, air compressors, pumps and the like.

In the engineering field it is a well known and universally recognized fact that a packing ring must fit snugly in the cylinder bore of the engine at all points around the periphery of the ring in order to prevent leakage of compression and oil and that an ideal piston ring should have some of the characteristics of rubber but at the same time stand up under heat, friction and other elements to which it is exposed which, of course, rubber would not do.

Heretofore, practically all packing rings for pistons have been made from cast metal such as cast iron either in one form or another in which the ring is split at one point on its side by cutting a section of the ring away. A ring of this type normally presents a periphery which is a true circle except where the slot or cut-away portion occurs. This normal periphery is larger in diameter than the bore of the cylinder in which it is to be placed and is reduced in diameter to fit such bore by pressing the ring together at the cut-away portion. When a ring of this character is so pressed together for the purpose of reducing its diameter for insertion in a cylinder bore in combination with a piston, the natural formation or shape of the ring is slightly oval in shape about its periphery and in order to force it into the bore of the cylinder the back sides of the ring with respect to the slotted side must be deformed or bent outward against the walls of the cylinder bore. This is against the natural reaction of the ring. The result of this deformation is to create an unequal lateral thrust against the wall of the cylinder varying at different points about the wall and reaching a maximum point adjacent that portion of the ring near the slot. This effect is an inherent feature with all cast metal rings of this type which results in wearing the ring thinner at one point than another and wearing the cylinder bore out of round also, to the end that, eventually the sides of the ring remote from the slotted side tend to recede from the wall of the cylinder and allow compression to blow by the piston and oil to pass in an opposite direction. There are also other forces in operation in a reciprocating engine tending to increase the oval shape of the cylinder bore, such as piston slap and piston side thrust caused by the revolutions about the crank shaft and excessive clearance between the cylinder wall and piston which may be to some extent traceable to worn rings.

Many attempts have been made in the past to construct a metal packing ring for pistons and the like which will stand up mechanically and give uniform flexibility on the cylinder wall, such as relatively thin cast metal rings with separate expander units located behind the ring for the purpose of holding the deformed shape against the cylinder wall in a more even degree of side thrust, and while such rings do accomplish the result of forming up to the out of round cylinder bore, yet it does so at the expense of the cylinder wall because of increased friction caused by the extremely high lateral side thrust on the cylinder walls. Most rings of this class, as well as modified types, are open ended rings—that is, the ends of the slots do not fully close as clearance must be left to allow for expansion under heat.

My present invention, however, is a closed end ring such that the two ends are in contact with each other, the expansion of the ring being taken up by the multiplicity of laminations comprising the body of the ring itself.

In my ring there may be as many as several hundred or more laminations substantially arranged in a vertical plane with respect to the cylinder wall, the laminations coacting against each other in a resilient and compressible manner. My complete ring is made with a diameter normally oversized with respect to the cylinder bore and when inserted in the bore the piston with rings attached may be pulled down through a tapering cone, the small end of which is approximately the size of the cylinder bore as it enters the cylinder block. This reduction in diameter creates an outward thrust against the cylinder wall uniformally the same at every fraction of a degree about the circumference of the ring. If the bore of the cylinder is slightly out of round as is the case where new rings are necessary, the extreme flexibility of my ring allows it to conform to the contour of the cylinder bore without requiring any appreciable amount of thrust as that point over any other point about the circumference of the ring. If my ring is made of the same material or of material having the same degree of hardness as in the cast metal type previously discussed, it is readily apparent that my ring will greatly outwear the prior ring without allowing any gases to blow by. Therefore, I can use a metal of a softer character than the prior rings, such as bronze, and attain the same length of life as would be present in the prior cast metal ring, but, in so doing, I have reduced the wear on the cylinder walls thereby prolonging the life and efficiency of the motor.

The amount of compressibility present in my ring depends upon the gauge and kind of metal used—that is, the smaller the gauge the greater the number of laminations, and the greater the temper of the material used the greater the expansibility. As the periphery of the ring wears the spaces between the laminations slightly expand although such expansion would not be perceptible at any one point with the naked eye and when the ring has worn sufficiently on its periphery for the spaces between the laminations to fully expand to their normal limits the ring will be due for replacement, and such replacement may be accomplished many times without reboring the cylinder walls while the length of life of any one ring may be approximately as long as in a cast iron ring, assuming that the proper material is used, this being made possible by the much lighter side thrust used in my ring over the cast metal types.

While my ring is ideally suited for replacement purposes to correct the out-of-round condition of the cylinder bore, yet, it is also ideally suited for new installation work because a ring of this character will greatly prolong the length of life of the cylinder bore which means more engine efficiently in every phase of the motor.

The type of packing ring comprising my present invention and to which this application is restricted is composed of a plurality of laminations constructed from a single ribbon of metal. In the preferred form illustrated in the drawings, an internal expander and supporting wire, or several wires, may be inserted in the body of the metal comprising the ring laminations, the wire being made of tempered steel adapted to withstand a relatively high degree of heat without becoming annealed.

The principal object of this invention, therefore, is an improved packing ring for pistons and the like.

Another object is a piston packing ring which is compressible throughout its lineal dimension.

Another object is a piston packing ring which is compressible and flexible transversally across the diameter of the ring.

Still another object is a piston packing ring which is closed at its ends when in use and therefore presents a continuous and substantially unbroken seal around the piston, and Other objects and novel features comprising the construction and operation of my invention will appear as the description of the same progresses.

In the drawings illustrating my present invention—

Fig. 1 is a perspective view of one of the preliminary steps in the process of forming the ring material;

Fig. 2 is another step in which the corrugations of the material have been pressed together;

Fig. 3 shows a section of the material incorporating therein a wire expander and supporting element, the material so being arranged that its laminated edges are adapted to bear directly on the inner wall of the cylinder;

Fig. 4 shows a material similar to Fig. 3 excepting the lower crimped edges which have not been swaged off flat as on the top;

Fig. 5 is the same material shown in previous figures but adapted to present the flattened loops of the corrugations to the wall of the cylinder;

Fig. 6 indicates a ring found from the material shown in either Fig. 3, 4 or 5 previous to insertion in the cylinder of a motor;

Fig. 7 is similar to Fig. 6 but showing the ring compressed in the cylinder;

Fig. 8 is a fragmentary view of a portion of a ring adjacent its opened and corresponding to the use of the material shown in Figs. 3 and 4—that is, the cylinder wall contact side of the ring material being the edges of the corrugated and compressed metal ribbon;

Fig. 9 shows a fragmentary cross section through a portion of a cylinder wall and piston illustrating the position of the material shown in Figs. 3, 4 and 8 when assembled for duty;

Fig. 10 shows a fragmentary view of a portion of a ring adjacent its opened end corresponding to the use of the material shown in Fig. 5—that is, the cylinder wall contact side of the ring material being the flattened loops of the corrugations;

Fig. 11 is a view similar to Fig. 9 but showing the material illustrated in Figs. 5 and 10 in place in a cylinder assembled for duty, and Fig. 12 illustrates one method of inserting the piston provided with the above described rings in the bore of a motor.

Referring to the drawings, 10 indicates a corrugated ribbon of metal having an alternate series of loops 11. The loops 11 are pressed together as shown in Fig. 2 such that a substantially solid material is obtained consisting of a great multiplicity of laminations. One or both of the looped sides of this material may be flattened by swaging as shown in Figs. 3 and 4 and indicated at 12. The top side of the material is always swaged and finished to present a perfectly smooth surface and contact in the groove 19 of the piston 20 for the purpose of retaining compression in the cylinder head of the motor. Under certain conditions it may be desirable to admit oil to the back of the ring in the ring groove 19 for the purpose of providing a cushion for the piston 20 when the piston tends to stop and also for lubrication of the ring. The scalloped surface 41 of the ring material allows oil to be forced in behind the ring to fill the groove 19 on the downward stroke of the motor such that this groove 19 is filled with oil when the piston 20 is at the upper part of the stroke and any slap of the piston will be reduced because then is a pressure of oil being forced into this groove 19 at the same time that the slap is in progress. The corrugated edges of the under side of the ring material forming the scallops 41 also provides means for oiling the walls of the cylinder bore.

In either type of ring as shown in Figs. 3 and 4 grooves 50 are milled in the back side of the ring for the purpose of inserting therein a spring steel wire 51 or a plurality of wires as the case may warrant. The wire 51 is adapted to be fastened loosely in the grooves 50 by swaging over the outer edges of the groove but at the same time allowing the laminations 15 of the ring to move on the wire freely. The wire 51 performs several functions; it maintains the ring against the cylinder wall, provides a supporting element for the ring material and makes possible an easily assembled joint at the ends of the ring.

When constructing a packing ring of this type from a single corrugated ribbon of thin enough material to have the necessary compressibility, difficulty is encountered in handling the ring before it is inserted in a motor because it is more or less fragile and easily ruptured or bent thereby opening up certain of the laminations such that they cannot be reshaped again properly and although it is very desirable to have a ring material which is very thin in its laminations and which consequently may be greatly compressed, yet it is necessary to have some means to prevent the material from collapsing inwardly when great force is exerted longitudinally of the ring material.

The enclosed expander wires 51 prevents such collapsing and at the same time provides a strengthening means to support the ring material when the ring is being handled prior to insertion in a motor.

Fig. 6 shows a piston 20 with a ring 21 around the piston. It will be noted that the wire 51 is shown out of the material which may be constructed as in Fig. 8 or 10. The ring 21 is now pressed together, the end of the wire 51 entering the opening 49 (see Figs. 8 and 10) of the ring material. The opposite ends of the wire 51 stop at a point short of the end of the groove 50 such that the extending end 51 may make an entry into the same groove or opening 50, better shown in Figs. 8 and 10. The piston 20 with ring 21 is now pulled down through a tapered cone 16 located above the cylinder block 60, the lower opening of the inner cone surface 17 being slightly larger than the bore 18 of the cylinder block 60. The laminations 16 of the ring now are compressed tightly together with the result that the normal diameter is reduced to the size of the bore 18 and due to the fact that the laminations have a certain amount of surface expansibility between them there is a considerable degree of side thrust set up by the ring on the wall 18 of the cylinder block 60.

The ring material may be formed from a spring material if desired and the laminations may not be compressed together to such an extent that they present a solid block, but yet, to the eye, they may present one solid surface. A small clearance between the laminations 15 of a hundredth part of a thousandth of an inch, when multiplied hundreds of times, produces a compressibility and expansibility of a considerable fraction of an inch.

Figs. 9 and 11 correspond to the ring material illustrated in Figs. 8 and 10 respectively, showing the position and arrangement of the material when in place in the ring grooves of a piston and contacting with the wall 18 of a cylinder block 60.

Having thus described my invention, what I claim as new is:—

1. In a sheet metal packing ring for pistons and the like, a ring composed of one continuous ribbon of sheet metal reversally folded upon itself to form a complete circle, the ends of said material adapted to contact together, said material supported and guided on internally disposed wires, said wires being loosely contained within, said ring material for the purpose of allowing the said material to expand and contract thereon, means for locking the ends of said ring material to prevent said material from getting out of alignment at said ends.

2. A flexible packing ring for pistons and the like comprising a single metal ribbon bent upon itself to form a multiplicity of substantially compact folds, the said folds presenting their edges in a parallel plane to the cylindrical sides of said piston, the tops of said folds swaged off in a flat plane for the purpose of making a tight fit along the upper side of the packing ring groove of said piston, the bottoms of said folds left in their natural rounded form and contacting at their extreme lowermost points with the lower sides of said packing ring groove on said piston for the purpose of allowing oil to pass between the said rounded ends of said folds to the back of said ring in said piston grooves, a supporting and expander wire imbedded longitudinally in said packing ring adapted to lock the ends of said ring together and allow longitudinal expansion of said ring on said wire and at the same time provide lateral side thrust on said ring 13.

3. A longitudinally and transversally flexible packing ring for pistons and the like comprising a multiplicity of transverse folds reversally bent upon each other, the periphery of said ring comprising the bent ends of said folds being swaged off into a flat vertical plane adapted to present a wearing surface when placed in the cylinder bore of a reciprocating engine, a circular wire expander adapted to be loosely imbedded in said ring for the purpose of producing radial thrust in said ring and a supporting element for said folds of said ring, said wire adapted to extend beyond one end of said ring and engage in an opening in the material of the opposite end of said ring for the purpose of maintaining alignment therebetween.

4. A piston packing ring composed of one continuous corrugated and compressed ribbon of metal adapted to compressibly butt together at the ends of said ring, said compressed corrugations flattened at their bends and supported together by an internally disposed wire of spring metal, said wire loosely confined within said corrugations such that the said corrugations may expand and contract longitudinally on said wire.

5. A piston packing ring composed of an internal expander wire loosely surrounded by a plurality of laminations, said laminations being formed from compressed corrugations folded upon each other in a reverse manner from a single ribbon of metal, the ends of said ring adapted to contact and compress said laminations when used in the bore of a cylinder as a packing ring.

6. A piston packing ring comprising in combination a corrugated and compressed ribbon of metal adapted to fit the packing ring groove of a piston and produce lateral thrust against the internal bore of a cylinder by lineal contraction of said corrugations, a cylindrical supporting member imbedded in said corrugations adapted to increase said lateral thrust and also provide support for said corrugations.

7. A piston packing ring material composed of one metal ribbon folded reversally upon itself to form a ring of rectangular cross section, an internally disposed wire loosely associated with said material with respect to its longitudinal dimension and adapted to support and expand the folds of said material, the bent edges of said folds being flattened to present a flat surface adjacent the top and bottom side of a piston packing ring groove, substantially as shown and described.

8. A piston packing ring material, the periphery of said ring having lower scalloped edges, each of said scallops comprising one-half of flat top segment, said scallops and said segments comprising one continuous ribbon of metal supported by an internal wire adapted to close the ends of said ring in abuttment and produce radial thrust in said ring material when the said material is compressed endwise for use in an internal combustion engine.

9. The combination of a compressible folded metal ribbon adapted to fit in the packing ring groove of a piston and a wire expander loosely imbedded in said folded ribbon and adapted to abutt at its ends and produce lateral thrust when compressed lengthwise in the bore of a cylinder, substantially as shown and described.

In testimony whereof, I have affixed my signature.

THOMAS A. BOWERS.